(12) United States Patent
Chikovani et al.

(10) Patent No.: US 9,476,710 B2
(45) Date of Patent: *Oct. 25, 2016

(54) AXIALLY SYMMETRIC CORIOLIS VIBRATORY GYROSCOPE (VARIANTS)

(71) Applicant: Innalabs Limited, Dublin (IE)

(72) Inventors: Valery Valerianovich Chikovani, Kiev (UA); Yurii Alekseevich Yatzenko, Kiev (UA)

(73) Assignee: Innalabs Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,764

(22) Filed: Apr. 15, 2016

(65) Prior Publication Data
US 2016/0238389 A1    Aug. 18, 2016

Related U.S. Application Data

(63) Continuation of application No. 14/112,921, filed as application No. PCT/RU2010/000683 on Nov. 19, 2010, now Pat. No. 9,322,655.

(51) Int. Cl.
*G01C 19/56* (2012.01)
*G01C 19/5691* (2012.01)

(52) U.S. Cl.
CPC ........... *G01C 19/56* (2013.01); *G01C 19/5691* (2013.01)

(58) Field of Classification Search
CPC .................................................. G01C 19/5691
USPC ........................................................ 73/504.13
See application file for complete search history.

(56) References Cited

U.S. PATENT DOCUMENTS

| 4,157,041 A * | 6/1979 | Loper, Jr. ........... | G01C 19/5691 73/504.13 |
| 6,662,656 B2 * | 12/2003 | Jeanroy .............. | G01C 19/5691 73/504.02 |
| 7,513,156 B2 * | 4/2009 | Chikovani ......... | G01C 19/5691 73/504.13 |
| 7,607,350 B2 * | 10/2009 | Choi .................... | H05K 7/1417 73/493 |

* cited by examiner

*Primary Examiner* — John Chapman, Jr.
(74) *Attorney, Agent, or Firm* — Bardmesser Law Group

(57) ABSTRACT

Coriolis vibratory gyroscope includes a thin-walled resonator, fastened centrally on a stem located within the resonator; with 4nk holes in a wall of the resonator and arranged around the stem, where "k" is integer, "n" is order of vibration modes, and the angle between adjacent holes is "π/2nk". The stem is rotationally symmetric and is fastened on a base; electrodes are arranged on the wall for excitation and measurement of vibration modes, with leads passing from the electrodes through the holes; the base has a seating for the resonator stem, and leads pass from the outside of the base through it, the leads being electrically-insulated and sealed relative to the base; the leads which pass through the base are connected to the leads which pass from the electrodes, allowing signals to pass from outside the base, through the base, through the holes in the resonator wall and to the electrodes.

14 Claims, 2 Drawing Sheets

AXIALLY SYMMETRIC CORIOLIS VIBRATORY GYROSCOPE (VARIANTS)

CROSS-REFERENCE TO RELATED APPLICATIONS

This application is a continuation of U.S. patent application Ser. No. 14/112,921, filed on Oct. 19, 2013, which is a US National Phase of PCT Application No. PCT/RU2010/000683, filed on Nov. 19, 2010, which are all incorporated by reference herein in their entirety.

FIELD OF TECHNOLOGY

The invention relates to gyroscopic instrument engineering and can be used for measuring angular velocities and rotation angles relative to inertial space within systems for orientation, navigation and control of motion. The invention relates to Coriolis vibratory gyroscopes and in particular to axisymmetrical gyroscopes based on cylindrical or hemispherical resonators.

DESCRIPTION OF THE RELATED ART

The gyroscope is an instrument for measuring or maintaining orientation. Gyroscopes are used inter alia in inertial navigation systems (INS), stabilization of terrestrial means of transport, aircraft, ships, optical guidance axes, position finding etc. Standard vibratory gyroscopes are described in the following U.S. Pat. Nos. 6,698,271, 7,120,548, 7,240,533, 7,216,525, 7,281,425, 5,597,955. CVG technology is preferable for use in inertial systems owing to its low cost, simple manufacture, reliability in comparison with gyroscopes of other types, such as ring laser gyroscopes (RLG) and fibre-optic gyroscopes (FOG). CVGs of low and medium accuracy are mainly gyroscopes of MEMS (microelectromechanical sensors). Some of them are already used in industrial and civil applications, and are also mass-produced for the automobile market. Gyroscopes for MEMS are mainly based on quartz resonators fabricated in accordance with the standards and development of microelectronics. They are widely used owing to their low price and compactness, but for several reasons their accuracy is inadequate (or difficult to achieve) for certain tactical and navigational purposes.

High accuracy is achieved with gyroscopes with resonators with high quality factor ($Q>10000$, $2/\tau=\omega/q$, where $\omega$ is the natural frequency of the resonator, Q is the quality factor of the resonator, $\tau$ is a time constant, according to standard IEEE 1431) with strict axial symmetry. Typical forms are the ring, hemisphere and cylinder, and the vibration modes employed are usually second-order vibrations (i.e., elliptical form). Attainment of the required results, based on these ring-shaped resonators, is much easier with second-order vibration, but other orders of vibrations may develop. One of the best known gyroscopes, belonging to the high-accuracy category, is HRG (hemispherical gyroscope with quartz resonator). HRGs display accuracy comparable to or even surpassing the accuracy of RLG and FOG owing to the use of quartz glass with high Q-factor as the material of the resonator.

In axisymmetrical resonators, such as ring, cylindrical or hemispherical, it is best to excite the elastic wave according to the second mode of resonator vibrations with specified amplitude, which is stabilized by a system for automatic gain control (AGC). This standing wave has four antinodes and nodes of the vibrations, where the amplitude of the vibrations is maximum and minimum, respectively. Rotation about the input axis of the vibrating structure creates Coriolis forces: $Fc=2m[\Omega \times V]$, where Fc is the Coriolis force vector, m is the modal mass of the resonator, $\Omega$ is the vector of the angular velocity with respect to the input axis of the resonator, and V is the vector of the linear velocity of the elements of the structure (during vibration). The sign x denotes the vector product (multiplication). The Coriolis forces activate the measured mode of the vibrations (its amplitude is proportional to the angular velocity of rotation). The measured mode is located at an angle of 45° to the excited mode so that its nodes are located on the antinodes of the excited mode. Signals proportional to the angular velocity of rotation are read from electrodes located on the nodes of the excited mode. To increase the frequency range of the gyroscope it is necessary to provide rapid damping of the measured mode. Damping of the measured mode is nearly always performed using electronics for force balancing of the wave, i.e., the signal of the measured mode is taken from electrodes located on the nodes of the excited mode and, through negative feedback, is fed to another electrode, located on the node of the excited mode. This leads to damping of the vibrations, i.e., decrease in the quality factor of the measured mode and correspondingly to an increase in the frequency range of the gyroscope. The feedback signal is proportional to the angular velocity of rotation about the measurement axis.

High-accuracy Coriolis vibratory gyroscopes will now be examined. As mentioned previously, axisymmetrical resonators of cylindrical or hemispherical shape, made of material with a high Q-factor, are mainly used in such gyroscopes. Regarding the dimensions of these gyroscopes, it should be pointed out that the total dimensions greatly exceed the actual size of the resonator itself. This is shown in the following patents: U.S. Pat. Nos. 7,281,4252, 3,656, 354, 2005/0126257. In practice these gyroscopes have much larger dimensions than MEMS gyroscopes, regardless of their configurations, "cup" (stem outside) or "mushroom" (stem inside).

In the device according to U.S. Pat. No. 4,644,793 (taken as the prior art), the resonator consists of a cylindrical shell, extending from a flat flexible plate, or membrane, on which it is fastened. On excitation of this plate it deforms the shell, and excites radial vibrations in it. On rotation of said resonator about its axis, the nodes of the vibrations move around the circumference of the shell owing to the action of Coriolis forces. These displacements of the wave pattern are transmitted to the plate on which the cylindrical shell is fastened. Sensing transducers, of the capacitance type in said prior art, record these displacements, and the angular velocity is determined from the change in amplitude of vibrations in the node.

Taking into account that MEMS gyroscopes cannot achieve high accuracy, or this is problematic, there is a need to reduce the size of CVGs with an axisymmetrical resonator of cylindrical or hemispherical shape. If the size of the gyroscope is reduced by reducing the size of the resonator, there will be a decrease in Q-factor of the resonator, and correspondingly in the accuracy of the gyroscope. The base on which the stem is fastened is nearly always a metal component with a hermetic glass joint. If the size of the resonator is reduced, the size of the base must also be reduced. However, with a large number of contacts (sealed leads), yet another restriction appears. It should also be pointed out that as the number of metallic sealed leads increases, the cost of the gyroscope also increases, and its reliability decreases (owing to leakage of gas).

SUMMARY OF THE INVENTION

The present invention aims to achieve a technical result that consists of decreasing the overall dimensions of an axisymmetrical Coriolis vibratory gyroscope, such as a cylindrical or hemispherical CVG, without employing the principle of reducing the size of the resonator.

According to an aspect of the invention there is provided a Coriolis vibratory gyroscope, wherein it comprises a thin-walled resonator of hemispherical or cylindrical or toroidal shape, fastened centrally on a stem located within the resonator; holes being made in a wall of the resonator, the holes being arranged around said stem, the number of holes being determined from the formula "4nk", where "k" is an integer, "n" is the order of vibration modes of the thin walled resonator, and the angle between each adjacent hole is equal to "π/2nk"; wherein said stem is rotationally symmetric about its longitudinal axis and is fastened on a base; electrodes are arranged on the resonator wall or alongside it for excitation and measurement of two vibration modes, with leads passing from the electrodes through holes in the resonator wall; the base is made with a seating for the resonator stem, and leads pass from the outside of the base through the base, the leads being electrically-insulated and sealed relative to the base; and the leads which pass through the base are connected to the leads which pass from the electrodes, thereby allowing signals to pass from outside the base, through the base, through the holes in the resonator wall and to the electrodes.

BRIEF DESCRIPTION OF THE ATTACHED DRAWINGS

The essence of the invention is illustrated in FIGS. 1-4, where:

DETAILED DESCRIPTION OF EMBODIMENTS OF THE INVENTION

Embodiments of the resonator in the form of a thin-walled hemispherical or cylindrical or toroidal configuration are examined.

Concrete implementations of this gyroscopic sensor are examined below.

Figure 1:
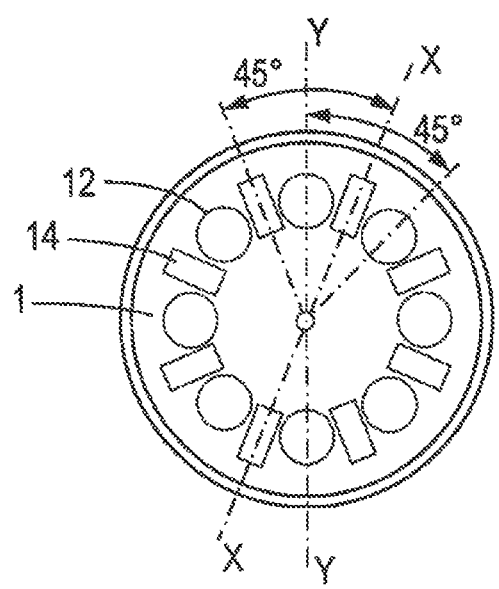
FIG. 1 is a horizontal projection of a cylindrical or hemispherical resonator with measuring and exciting electrodes, with 8 holes. The size and position of the electrodes are selected so as to obtain signals required for the control electronics.

FIG. 1 shows the holes in the bottom of the resonator, arranged in a circle with respect to the input axis of a cylindrical or hemispherical resonator. In this case we have 8 holes and 8 electrodes, arranged symmetrically between the holes. The electrodes are located on the outside of the resonator. The angle between each adjacent pair of holes is equal to 45°. The electrodes are preferably made of piezoceramic plates, but in a hemispherical resonator made of quartz these electrodes can be capacitors, which supply electrostatic forces. An example of a CVG with a cylindrical resonator is shown in FIG. 2.

Figure 2:
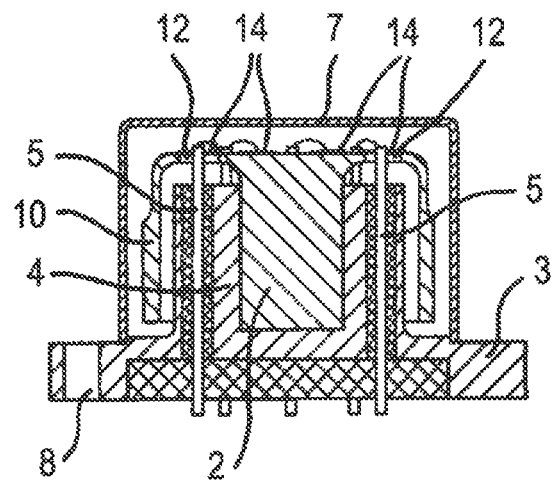
FIG. 2 is a variant of construction of the gyroscope with a cylindrical resonator.

Elements shown in FIG. 2: cylindrical resonator 1, made in the form of a thin-walled cup with a cylindrical lateral wall, secured on a stem 2 of a mushroom shape (or some other cylindrical shape), base 3 with component 4 inside the resonator 1, which is a cup-shaped projection, into which the resonator stem is inserted, electrodes 14 are made of piezoceramic, in order to excite and measure the required vibrations, as well as measure their parameters, pin electrodes 5 (hereinafter: electrically-insulated sealed leads 5) for lead-in/lead-out of signals through base 3, cylindrical (cylinder-shaped or mushroom-shaped) stem 2, located inside the resonator (fastened to it or made in one piece with it), serves as fastening of resonator 1 to base 3, cap 7 covers the resonator and maintains the specified pressure inside (however, it should preferably be a vacuum), holes 8 are used for locating the gyroscope in the unit (for example IMU, i.e., inertial measuring unit). The stem should preferably be made in the form of a solid or partially hollow cylinder. Holes for passing the pin electrodes 5 through are made in component 4.

Figure 3:
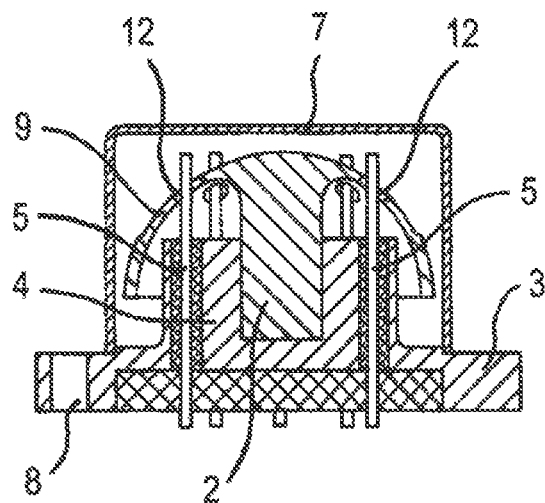
FIG. 3 is a variant of construction of the gyroscope with a hemispherical resonator.
Figure 4:
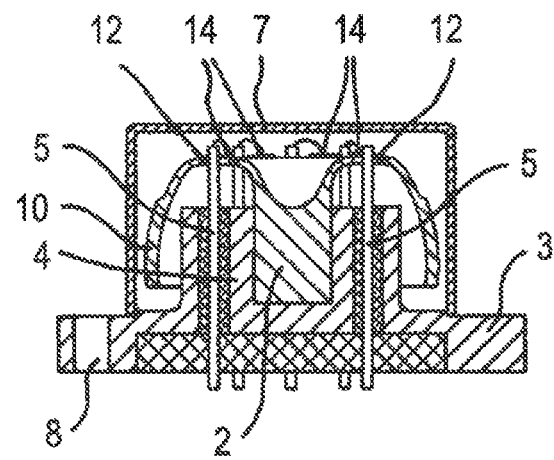
FIG. 4 is a variant of construction of the gyroscope with a toroidal (hemispherical flat-bottomed) resonator.

FIGS. 3 and 4 show practical examples of a Coriolis vibratory gyroscope with hemispherical 9 and toroidal 10 resonator, respectively. The overall dimensions of these gyroscopes are the same as for the gyroscope shown in FIG. 2. In this configuration it is possible to achieve the following overall dimensions: height 25 mm, diameter 30 mm (including cap). However, it is also possible to obtain a smaller size, with height less than 10 mm, which is comparable to the body of a MEMS.

The dimensions of the gyroscope are minimized by using holes in the bottom and a space inside the resonator. This space is filled with a base for fixation of the resonator by means of sealed leads. As a result it becomes possible to minimize not only the height of the gyroscope, but also its diameter, approaching the corresponding dimensions of the resonator.

In this design the sealed leads 5 for lead-in/lead-out pass through the holes 12 in the resonator. The conductive connection provides direct electrical connection of the electrodes with the sealed leads.

Based on these examples, an algorithm can be specified for constructing a design for compact high-accuracy Coriolis vibratory gyroscopes with ring resonators in the form of a cylinder or hemisphere: holes in the bottom, arranged in a circle, preferably 8 in number, with 45° spacing, stem inside the resonator (mushroom shape); the resonator is mounted by means of the stem on the base, located inside a cup-shaped projection; connection between the electrodes of the resonator and the sealed leads is provided by a connecting lead directly to the sealed leads through the holes.

In the present invention, in a Coriolis vibratory gyroscope (CVG), and in particular in an axisymmetrical gyroscope, the technical result is achieved as a result of the following implementation design features:

In one of the variants of the present invention, holes are made in the bottom of the resonator, and the stem is located inside ("mushroom" shape).

The desirable number of holes is 8, in the second order of exciting mode. However, there can be many more holes. Let "n" be the order of the modes, and specify the number of holes with the equation "4nk", where "k" is an integer. At "n=2" and "k=1", the number of holes is equal to 8.

Regarding the conditions of symmetry, the angle between two adjacent holes will be "π/2nk". This angle also determines the position of the axes of symmetry of the resonator (in a plane perpendicular to the input axis of the resonator). At "n=2", the angle is equal to 45°.

It is best to make the stem in the form of a solid or partially hollow cylinder, but it need not necessarily be a right cylinder, it is possible to use other symmetrical shapes, taking second-order vibrations into account (for example, the right section of the stem can be an octagon in the second order of vibration, i.e., the second order leads to elliptical forms of modes).

In the base there is a blind hole, directed into the resonator. This hole provides fixing of the resonator by means of the free end of the stem. This fixing is located inside the resonator, with maximum filling of the space within it.

In essence, the number of electrodes is determined by the same laws as the number of holes, as was defined above. However, this number can be divided by 2, using techniques of time separation of the signal (one and the same electrode is used alternately for excitation and measurement of vibration). In the case of second order with the original electronic control circuit without the time separation technique, the desired number is equal to 8. In this case it can be seen from the materials of the application that these electrodes need to be connected in pairs. When using electrodes of identical polarity, pairs of opposite electrodes (located at an angle of 180°) are connected together. When using electrodes of opposite polarity, two electrodes located at an angle of 90° are connected together.

Leads are soldered directly between the electrodes and the sealed leads in the base, with identical number of sealed leads and resonator electrodes. Connection between the electrodes can be made outside the gyroscope, if necessary, for example in the electronics unit.

As can be seen from the above description, Coriolis vibratory gyroscopes of highest accuracy can be made smaller mainly by using holes in the bottom of the resonator.

The above descriptions of devices only illustrate the present invention and it is not limited to these. Any design modification that preserves the content of the present invention must be interpreted as conforming to the claims.

It should also be appreciated that various modifications, adaptations and alternative embodiments thereof may be made within the scope and spirit of the present invention. The invention is further defined by the following claims.

What is claimed is:

1. An axisymmetrical Coriolis vibratory gyroscope, comprising:
   a thin-walled resonator of hemispherical or cylindrical or toroidal shape, fastened centrally on a stem located within the resonator;
   a wall of the resonator having holes arranged around the stem, a number of holes based on "4nk", where "k" is an integer, "n" is an order of vibration modes of the thin walled resonator, and an angle between adjacent holes is equal to "π/2nk";
   wherein
   the stem is shaped as a solid or partially hollow cylinder, and is rotationally symmetric about its longitudinal axis and is fastened on a base;
   electrodes are arranged on the resonator wall or alongside the resonator wall for excitation and measurement of two vibration modes, with leads passing from the electrodes through holes in the resonator wall;
   the base includes a seating for the resonator stem, and leads pass from the outside of the base through the base, the leads being electrically-insulated and sealed relative to the base; and
   the leads that pass through the base are connected to the leads that pass from the electrodes, thereby allowing signals to pass from outside the base, through the base, through the holes and to the electrodes.

2. The gyroscope of claim 1, wherein electrical insulation and sealing of the leads ends inside the cavity of the resonator.

3. The gyroscope of claim 1, wherein the number of holes in the resonator wall is equal to 8 and the number of electrically-insulated sealed leads is equal to 8.

4. The gyroscope of claim 1, wherein the electrodes are piezoceramic and are attached to the resonator by gluing or soldering.

5. The gyroscope of claim 1, wherein the resonator is made of metal alloys, quartz glass or of crystalline materials with a high Q-factor.

6. The gyroscope of claim 1, further comprising a cap covering the resonator, wherein the cap is configured to maintain a specified pressure inside the cap.

7. The gyroscope of claim 1, wherein the leads which pass from the electrodes are directly connected to the leads that pass through the base.

8. An axisymmetrical Coriolis vibratory gyroscope, comprising:
   a thin-walled resonator having a rotationally symmetrical shape, the resonator attached to a stem located within the resonator, wherein the stem is shaped as a solid or partially hollow cylinder; and
   a wall of the resonator having holes arranged around the stem, with an angle between adjacent holes equal to "π/2nk", where "k" is an integer, and "n" is an order of vibration modes of the thin walled resonator;
   a base to which the stem is fastened; and
   electrodes arranged on the resonator wall or alongside the resonator wall for excitation and measurement of two vibration modes, with leads passing from the electrodes through holes in the resonator wall;
   wherein
   the stem is rotationally symmetric about its longitudinal axis;
   the base includes a seating for the resonator stem, and leads pass from the outside of the base through the base, the leads being electrically-insulated and sealed relative to the base; and
   the leads that pass through the base are connected to the leads that pass from the electrodes, thereby allowing signals to pass from outside the base, through the base, through the holes and to the electrodes.

9. The gyroscope of claim 8, wherein electrical insulation and sealing of the leads ends inside the cavity of the resonator.

10. The gyroscope of claim 8, wherein the number of holes in the resonator wall is equal to 8 and the number of electrically-insulated sealed leads is equal to 8.

11. The gyroscope of claim 8, wherein the electrodes are piezoceramic and are attached to the resonator by gluing or soldering.

12. The gyroscope of claim 8, wherein the resonator is made of metal alloys, quartz glass or of crystalline materials with a high Q-factor.

13. The gyroscope of claim 8, further comprising a cap covering the resonator, wherein the cap is configured to maintain a specified pressure inside the cap.

14. The gyroscope of claim 8, wherein the leads which pass from the electrodes are directly connected to the leads that pass through the base.

\* \* \* \* \*